Patented Oct. 20, 1925.

1,558,082

UNITED STATES PATENT OFFICE.

DANIEL GARDNER, OF WEYBRIDGE, ENGLAND.

MANUFACTURE OF PAINTS.

No Drawing.  Application filed August 21, 1922. Serial No. 583,378.

*To all whom it may concern:*

Be it known that I, DANIEL GARDNER, a citizen of Russia, and residing at Westfield, Mayfield Road, Weybridge, in the county of Surrey, England, have invented certain new and useful Improvements in and Relating to the Manufacture of Paints, of which the following is a specification.

This invention relates to improvements in the manufacture of paints, and has for its object an improved method of treating bitumens, asphaltites and similar products used for the manufacture of black paints, varnishes, enamels and japans.

It is already known that for special purposes bituminous products undergo a preliminary treatment when used for the manufacture of acid and alkali-proof paints and varnishes. After numerous experiments it has been ascertained that it is essential to prepare the bituminous base before the above-mentioned treatment if the final product is to be of high grade.

The present application relates to this preliminary preparation and consists in the processes hereinafter described and more particularly pointed out in the claims.

In carrying the invention into effect in one form, the bituminous product is heated to a temperature of, say, 125–140° centigrade to eliminate the hydrocarbon content in the bitumens which are volatile at the above temperature. The product is then ground into a fine powder and treated with a substance, say, an acid or alkali of the desired concentration the action of which is to be resisted by the final product. During the heating it is most important to arrange for an equal distribution of the heat throughout the whole layer of the bituminous substance. As the volatile hydrocarbons have a considerable market value they are collected by passing the gases through suitable scrubbers.

To facilitate the removal of the volatile products and to prevent local overheating and possible carbonization, the bituminous substance is preferably continuously stirred. The heating step can conveniently be carried out in an atmosphere of inert gas which circulates through a closed system including the receptacle in which said material is being heated. To avoid oxidation the air is preliminarily removed from the apparatus. Hot air or oxygen in the presence of moisture produces an undesirable result. This preliminary treatment of the bituminous product has the advantage that a higher grade of bituminous material is produced which on the application of an acid or alkali loses its original stickiness.

Bituminous products must not be overheated, as this strongly affects the physical and chemical properties of the bitumen. The heating is therefore preferably carried out quickly at a temperature not exceeding 150° centigrade. At a higher temperature than this the properties of the bitumens (especially their weather-resisting properties) are much changed possibly owing to the partial polymerization which can take place.

In the course of my experiments it has been ascertained that very good results are obtained by the following alternative treatment:—Finely ground bituminous products from which the volatile hydrocarbons have been driven off, are placed in an autoclave and treated at a pressure of 5 to 8 atmospheres while being continuously stirred with a solvent such as solvent naphtha, or any solvent containing hydrocarbons, whether of the saturated, unsaturated, aromatic, terpene or any other of the cyclic compound types, provided boiling point range within the range 80° and 180° centigrade. After maintaining the pressure for a time, the vapors are let off and carefully collected and the product in the autoclave is cooled. This product consists of a concentrated extract of the bitumens in the solvent used. A certain part of the bituminous material, however, remains undissolved, and dissolution of this part may be obtained by the use of suitable solvents, dependent on the nature of the undissolved bituminous material. The part which dissolves in the hydrocarbons is used for the manufacture of high grade black paint or varnish, while the part which dissolves later on can be utilized for the production of lower grade paint or varnish products or for the manufacture of bituminous paving materials, fabrics for roofing, flooring, water-proofing, insulating, or for other known purposes. The concentrated extract of the bitumen in the first mentioned solvent used, can be further mixed with such ingredients as are considered to meet the special requirements for which the paint or varnish is to be used. Among such requirements may be mentioned the non-stickiness and quick drying of the paint or varnish, the class of surface produced, its durability, its quality of being water-, weather-, acid-, alkali-, grease or vermin-proof, anti-corrosive, non-conductive, non-inflammable, flexible, and its power of resisting high temperatures.

It is already known how these properties may be met by the use of suitable solvents, fillers, driers and other ingredients, but my experiments have conclusively shown that such characteristics cannot be obtained with any degree of certainty without a preliminary treatment of the bitumen or product used. This is particularly so if the paint or varnish must possess two or more of the above mentioned characteristics.

Very good results are obtainable by treating the fine ground bituminous product with dry steam, especially superheated steam, collecting the most volatile fractions separately, and passing the remaining part of the bitumen quickly through a sieve while still hot and, after separating any water that may be present dissolving the treated product in a suitable hydrocarbon until required for further use.

The introduction of hot dry gases such, for example, as nitrogen, carbon dioxide and sulphur dioxide will facilitate the use of bituminous material for high grade paints and varnishes. It is to be particularly noted that all ingredients also have to be completely dry if high grade final products are contemplated.

When using the autoclave process good results are obtained by introducing into the sphere of reaction, as a solvent, turpentine and anhydrous white copper sulphate, these materials giving the best results when in the following proportions:—

|  | Per cent. |
|---|---|
| Bitumen | 55 |
| Turpentine | 35 |
| Copper sulphate | 10 |

The charge is then heated in an autoclave up to a pressure of about 5 to 8 atmospheres, the following reaction taking place:—

$$CuSO_4 + C_{10}H_{16} = CuO + SO_2 + C_{10}H_{14} + H_2O$$

Cymene is formed, which is an especially good solvent for bitumens. The sulphur dioxide and other volatile products which tend to cause stickiness of usual bituminous paints are removed. The remaining products are washed with hot water, the cymene extract layer is separated, and the copper oxide is treated with sulphuric acid to regenerate the copper sulphate required for further use.

After having separated the extract of bitumen from the other substances present, it is important to eliminate all moisture, the presence of which causes blistering and cracks in the paint or varnish, after being applied as a coating. Thus for the highest grades of black bituminous paints and varnishes this reaction with turpentine and copper sulphate is especially advisable, mainly owing to the presence of the cymene formed, which acts as an excellent thinner. The introduction of cymene directly into the bitumen gives far inferior results.

The non-inflammable properties of the paints may be influenced by the introduction by known methods of chloroform, carbon tetrachloride, dieline, (dichloro ethylene, $C_2H_2Cl_2$) etiline, (tetrachloro ethylene $C_2Cl_4$) or tetraline (tetrachlor ethane, $C_2H_2Cl_4$), but these have the objection that they have the tendency of causing running and also reduce the lustre, although these objections are partly overcome by the introduction of small quanties of benzene, petrol and more volatile solvents.

When preparing non-inflammable bituminous paints, this property should be considered in conjunction with other characteristics, and it is better to use the chlorine compounds of aromatic hydrocarbons, such as monochlorbenzene, dichlorbenzene (ortho or para) and even, for special purposes, the higher products up to hexachlorbenzene, thus avoiding the necessity for introducing more volatile solvents. The chlorine compound is introduced in small quantities at a time in the presence of resinates and Acheson graphite of the special grade A.F.1, or silicide of carbon or substances of a similar nature. The presence of pure resin is not advisable, as it greatly reduces the weather-resisting properties of the paint or varnish manufactured. The use of the graphite acts to counteract the active rays of the light, which (as is known) would cause decomposition of the bituminous substances.

I have found that better results may be obtained when adding the ortho or para dichlorbenzenes if a small amount of ortho triphenyl phosphate (or tricresyl phosphate) and para triphenyl phosphate (or para tricresyl phosphate) is added to the ortho or para product respectively.

Further, it is desirable to state that the question of the solubility of bitumen used in carbon disulphide is of importance as it does not necessitate the sieving of hot bitumen, an operation which is very difficult to carry out without special facilities. The more soluble the bitumen the better. For example, when the degree of solubility approximates 99.8% very satisfactory results are obtained.

Chlorine compounds of toluene and the higher aromatic compounds also give satisfactory results. The practical application of these thinners may, however, be very much hampered by their high cost.

The expression "strongly non-neutral reactive substances" as used in the claims, is intended to designate acids and alkalies (of course including any highly acid materials or highly alkaline substances).

I claim:

1. A method of treating bitumens, asphaltites and similar materials for the manufacture of coating compositions which are resistant to a strongly acid or alkaline reactive substance which comprises first heating the materials up to 125–140° C., to remove the more volatile hydrocarbons, while maintaining in the material, an equal distribution of the heat, treating the product obtained with a strongly non-neutral reactive substance, the action of which is to be resisted by said product and thereafter eliminating any moisture present.

2. In the production of liquid coating compositions from bitumens, asphaltites and similar materials, the step of maintaining said material at a temperature of 125 to 140° C., while preventing local overheating, such operation being conducted in a non-oxidizing atmosphere.

3. A process of treating bitumens, asphaltites and similar materials for the manufacture of coating compositions, which comprises first heating the material up to 125 to 140° C., to remove the more volatile hydrocarbons, while avoiding local overheating, placing the product in an autoclave, with a hydrocarbon solvent, the continuous stirring while heating under pressure to a temperature not exceeding 180° C., and thereafter drying the product so obtained.

4. A method of treating bitumens, asphaltites and similar materials for the manufacture of coating compositions which comprises heating the said material up to a temperature between 125 and 140° while in contact with an inert atmosphere, whereby readily volatile materials are evaporated, and passing the remaining part, while in a molten state, through a sieve, and thereafter separating any water that may be present, and dissolving a part at least of the treated product in a solvent.

5. In the method of treating bitumens, asphaltites and similar materials for the manufacture of coating compositions, the improvement which comprises first removing constituents which are volatile, at 125 to 140° C., then placing the remaining material in an autoclave with turpentine and copper sulfate and heating to a temperature not exceeding 180° C., whereby cymene is produced which exerts a solvent action on the said material.

6. A method of treating bitumens, asphaltites and similar material for the production of coating compositions, which comprises driving off materials volatile at 125 to 140° C., and digesting the residual product in the solvent under pressure, such solvent including chlorine derivatives of aromatic hydrocarbons.

7. A liquid coating composition containing the soluble constituents of bituminous materials, but free from those constituents thereof which are volatile at 125 to 140° C., such product also containing chlorine compounds of aromatic hydrocarbons.

8. A liquid coating composition containing the soluble constituents of bituminous material, but free from those constituents thereof which are volatile at 125 to 140° C., such product also containing chlorine compounds of aromatic hydrocarbons, together with graphite.

DANIEL GARDNER.